United States Patent
Kim et al.

(10) Patent No.: US 10,544,374 B2
(45) Date of Patent: Jan. 28, 2020

(54) PROCESS FOR REDUCING HAZE IN HEAVY BASE OIL AND HYDROISOMERIZATION CATALYST SYSTEM HAVING REDUCED HAZE

(71) Applicants: SK Innovation Co., Ltd., Seoul (KR); SK Lubricants Co., Ltd., Seoul (KR)

(72) Inventors: Do Kyoung Kim, Daejeon (KR); Do Woan Kim, Daejeon (KR); Seung Woo Lee, Daejeon (KR); Yoon Kyung Lee, Daejeon (KR); Seon Ju Lim, Daejeon (KR)

(73) Assignees: SK Innovation Co., Ltd., Seoul (KR); SK Lubricants Co., Ltd., Seoul (KR)

( * ) Notice: Subject to any disclaimer, the term of this patent is extended or adjusted under 35 U.S.C. 154(b) by 104 days.

(21) Appl. No.: 15/496,506

(22) Filed: Apr. 25, 2017

(65) Prior Publication Data

US 2017/0306251 A1   Oct. 26, 2017

(30) Foreign Application Priority Data

Apr. 26, 2016   (KR) .......................... 10-2016-0050619

(51) Int. Cl.
| | |
|---|---|
| *C10G 65/04* | (2006.01) |
| *B01J 29/74* | (2006.01) |
| *B01J 29/72* | (2006.01) |
| *B01J 29/70* | (2006.01) |
| *C10G 45/64* | (2006.01) |
| *B01J 29/12* | (2006.01) |
| *B01J 29/22* | (2006.01) |

(52) U.S. Cl.
CPC .......... *C10G 65/043* (2013.01); *B01J 29/126* (2013.01); *B01J 29/22* (2013.01); *B01J 29/703* (2013.01); *B01J 29/7034* (2013.01); *B01J 29/7215* (2013.01); *B01J 29/7261* (2013.01); *B01J 29/7269* (2013.01); *B01J 29/74* (2013.01); *B01J 29/7461* (2013.01); *B01J 29/7469* (2013.01); *C10G 45/64* (2013.01); *C10G 2300/304* (2013.01)

(58) Field of Classification Search
CPC .. B01J 29/703; B01J 29/7034; B01J 29/7261; B01J 29/7269; B01J 29/7461; B01J 29/7469; B01J 29/80; C10G 45/58–64; C10G 65/043
See application file for complete search history.

(56) References Cited

U.S. PATENT DOCUMENTS

| | | | |
|---|---|---|---|
| 4,482,531 A | 11/1984 | Kuehl | |
| 4,557,919 A | 12/1985 | Sumitani et al. | |
| 4,599,162 A | 7/1986 | Yen | |
| 4,741,891 A | 5/1988 | Casci et al. | |
| 4,836,996 A | 6/1989 | Casci et al. | |
| 4,876,412 A | 10/1989 | Casci et al. | |
| 4,919,788 A | 4/1990 | Chen et al. | |
| 4,935,120 A | 6/1990 | Lipinski et al. | |
| 5,098,685 A | 3/1992 | Casci et al. | |
| 6,051,129 A | 4/2000 | Harris et al. | |
| 6,984,309 B2 | 1/2006 | Benazzi et al. | |
| 2004/0108245 A1 | 6/2004 | Jiang et al. | |
| 2007/0158237 A1 | 7/2007 | Adams et al. | |
| 2010/0075831 A1 | 3/2010 | Elia et al. | |
| 2014/0367310 A1 | 12/2014 | Kim et al. | |

FOREIGN PATENT DOCUMENTS

| | | |
|---|---|---|
| JP | 10505128 A | 5/1998 |
| KR | 1020110115010 A | 10/2011 |
| WO | 9607715 A1 | 3/1996 |

OTHER PUBLICATIONS

Kirschhock et al., "Ordered End-Member of ZSM-48 Zeolite Family", Chem. Mater., 2009, pp. 371-380, vol. 21, No. 2.

*Primary Examiner* — Renee Robinson
(74) *Attorney, Agent, or Firm* — The Webb Law Firm

(57) ABSTRACT

A process for reducing haze in a heavy base oil includes: obtaining a first effluent oil by contacting a hydrocarbon feedstock with a first catalyst including a zeolite of the ZSM-12 family; and obtaining a second effluent oil by contacting the first effluent oil with a second catalyst including a zeolite of the ZSM-48 family. A hydroisomerization catalyst system having reduced haze includes: a first catalytic region having a first catalyst disposed therein, the first catalyst including a zeolite of the ZSM-12 family; and a second catalytic region having a second catalyst disposed therein, the second catalyst including a zeolite of the ZSM-48 family. The first catalytic region is disposed upstream of the second catalytic region.

16 Claims, No Drawings

US 10,544,374 B2

PROCESS FOR REDUCING HAZE IN HEAVY BASE OIL AND HYDROISOMERIZATION CATALYST SYSTEM HAVING REDUCED HAZE

CROSS-REFERENCE TO RELATED APPLICATION

This application claims priority to Korean Patent Application No. 10-2016-0050619 filed Apr. 26, 2016, the disclosure of which is hereby incorporated in its entirety by reference.

BACKGROUND

The present disclosure relates to a process for reducing haze in a heavy base oil and a hydroisomerization catalyst system having reduced haze and, more particularly, to a process for effectively reducing haze while significantly minimizing yield loss in a hydroisomerization process, and a hydroisomerization catalyst system applicable to the same.

Catalytic dewaxing processes change undesired molecules in raw materials to molecules having desired characteristics for specific purposes. More specifically, the catalytic dewaxing processes may be applicable in various fields through being used to improve the characteristics of base oil that forms lubricating oil, as well as to enhance the cold flow properties of diesel oil. Such catalytic dewaxing processes are performed by cracking or isomerizing molecules in raw materials. Since dewaxing methods, among the variety of dewaxing methods, which depend mainly on cracking, produce large amounts of products having a low viscosity index, the cracking dominant dewaxing methods have a low yield compared to dewaxing methods largely relying on isomerization. Thus, the isomerization dominant dewaxing methods have been preferred, in which hydroisomerization catalysts are used.

Meanwhile, in refining processes such as the production of lubricating oil and diesel oil, the importance of hydroisomerization reactions in converting long-chain, normal paraffins (n-paraffins) to iso-paraffins has emerged. This is the reason that the long-chain, n-paraffins have low-temperature fluidity, and thus cannot meet the recently required standards of fuel oil and lubricating oil products. In particular, the quality of crude oil as a raw material has deteriorated in recent years. However, with the development of automobile engine technology, higher quality products are required for fuel oil and lubricating oil products. For example, hydroisomerization reactions may be applied to processes for manufacturing high-octane gasoline using $C_4$-$C_7$ hydrocarbon as a raw material, to processes for manufacturing high-quality, high-cetane diesel oil having improved cold flow properties using $C_7$-$C_{15}$ hydrocarbon as a raw material, and to processes for manufacturing high-quality lubricating oil having a high viscosity index and improved cold flow properties using C15 or higher hydrocarbon as a raw material.

The above-mentioned hydroisomerization reactions have been performed mainly by bi-functional catalysts, and the catalysts typically consist of metal components having a hydrogenation/dehydrogenation function and of supports having acid sites for a skeletal isomerization reaction. In this regard, various materials, such as amorphous silica-alumina, clay, and zeolite, which is crystalline silica-alumina, have been known as supports having acid sites. In particular, zeolites are not only maintained to have a stable structure, even under severe reaction conditions, but also have a wide surface area and a plurality of acid sites, thereby being suitable for an isomerization reaction.

Research has been conducted into zeolites having excellent shape selectivity, whereby an undesired decomposition reaction of hydrocarbons to be processed is preferably suppressed, while maximizing an isomerization reaction of the hydrocarbons. It has been reported that ZSM-22, ZSM-23, EU-2 and ZSM-48 zeolites having a 1-dimensional 10-ring pore structure have excellent shape selectivity in a hydroisomerization reaction.

Meanwhile, according to the catalogues of the International Zeolite Association (IZA), EU-2, ZSM-48, ZBM-30 and EU-11 zeolites belong to the ZSM-48 family, which have a similar X-ray diffraction (XRD) pattern, i.e. a crystal structure. As described above, U.S. Pat. No. 6,984,309 discloses a technology that improves the viscosity index, low-temperature fluidity, and the like, of hydrocarbon oil by using EU-2 zeolite or EU-2 zeolite and a binder as a support, and performs a hydroisomerization reaction in the presence of a catalyst in which a hydrogenation/dehydrogenation metal is loaded on the support.

In heavy base oil or bright stock having a relatively high boiling point, compared to common base oil, it has been found to be difficult to meet cold flow properties by a conventional dewaxing method that has been applied to the base oil. Furthermore, even when the conventional dewaxing method satisfies the standards of low-temperature fluidity, it is very difficult to remove haze-inducing substances. Therefore, reducing haze from heavy base oil or bright stock has not been found to be easy. Paraffins, such as, commonly, long-chain n-paraffins, partially isomerized long-chain n-paraffins, and cycloparaffins, have been known as haze-inducing substances. Such haze-inducing substances do not cause any problem at room temperature. However, under conditions of a comparatively low temperature, such as 0° C., and a relatively long term, such as 7 days, the haze-inducing substances may agglomerate with each other, resulting in a haze that makes products cloudy. Also, haze-inducing substances may be removed under more severe dewaxing reaction conditions, such as an increase in reaction temperature, which may accompany undesired yield loss.

Therefore, a method of selectively removing haze-inducing substances, while minimizing yield loss, is required, and many attempts at the same have been reported. U.S. Pat. No. 4,919,788 discloses a method of removing haze-inducing substances by adding a catalyst consisting of a support of an ultrastable Y zeolite or a beta-type (BEA) zeolite to a catalyst consisting of a support of a common dewaxing catalyst such as ZSM-22 or ZSM-23 zeolite. Moreover, U.S. Pat. No. 6,051,129 discloses a method of removing haze-inducing substances by adding a catalyst consisting of a EU-1 zeolite support to a catalyst consisting of a support of a common dewaxing catalyst, such as ZSM-48 or ZSM-32 zeolite. However, these methods are undesirable because, although haze-inducing substances are removed, they involve a decrease in yield.

Therefore, it is expected that when a method of selectively removing haze-inducing substances while minimizing yield loss is provided in a dewaxing process for a heavy base oil containing haze-inducing substances, the method will be widely applicable in the related art.

SUMMARY

An aspect of the present disclosure may provide a process for reducing haze in a heavy base oil, which may effectively reduce haze while significantly minimizing yield loss.

Another aspect of the present disclosure may provide a hydroisomerization catalyst which may effectively reduce haze while significantly minimizing yield loss.

According to an aspect of the present disclosure, a process for reducing haze in a heavy base oil may include: obtaining a first effluent oil by contacting a hydrocarbon feedstock with a first catalyst including a zeolite of the ZSM-12 family; and obtaining a second effluent oil by contacting the first effluent oil with a second catalyst including a zeolite of the ZSM-48 family.

According to another aspect of the present disclosure, a hydroisomerization catalyst system having reduced haze may include: a first catalytic region having a first catalyst disposed therein, the first catalyst including a zeolite of the ZSM-12 family; and a second catalytic region having a second catalyst disposed therein, the second catalyst including a zeolite of the ZSM-48 family, in which the first catalytic region is disposed upstream of the second catalytic region.

DETAILED DESCRIPTION

Hereinafter, embodiments of the present disclosure will be described.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations, and only a required configuration is proposed herein, but the present disclosure is not limited thereto.

The terms used herein may be defined as follows.

The term "ZSM-48 family" is disclosed in Journal of Chemical Research, 192 (1985), U.S. Pat. Nos. 4,741,891, 4,836,996, 4,876,412, and 5,098,685, and the foregoing prior art is incorporated as a reference for the present disclosure. In addition, in the present specification, mainly EU-2 zeolite is discussed, but the present disclosure is also applicable to other zeolites belonging to the ZSM-48 family, for example, ZSM-48, ZBM-30 and EU-11 zeolites.

The term "zeolite of ZSM-12 family" is disclosed in U.S. Pat. Nos. 4,482,531, and 4,557,919, and the foregoing prior art is incorporated as a reference for the present disclosure. In addition, in the present specification, mainly ZSM-12 zeolite is discussed, but the present disclosure is also applicable to other zeolites belonging to the ZSM-12 family.

Thus, according to an example, a first catalyst may include a ZSM-12 zeolite, and a second catalyst may include at least one selected from the group consisting of ZSM-48, EU-2, ZBM-30 and EU-11 zeolites.

The above-mentioned zeolite is used as a support (a carrier) of a catalyst, according to an example.

Meanwhile, the term "hydroisomerization reaction" refers to a reaction in which at least a portion of normal paraffins is converted into iso-paraffins under the presence of hydrogen on the catalyst. The hydroisomerization reaction may accompany some cracking reactions. For example, the conversion of the normal paraffins by an isomerization reaction, while suppressing the cracking reactions as much as possible, may be significantly increased yield of a target product.

The term "pour point" refers to a minimum temperature at which the flow of liquid hydrocarbons has fluidity under given conditions.

The present disclosure provides a process for reducing haze in a heavy base oil which may improve cold flow properties of the heavy base oil while maintaining a high yield in a hydroisomerization process, and a catalyst that may be used in the process.

In detail, the process for reducing haze in a heavy base oil according to an example may include obtaining a first effluent oil by contacting a hydrocarbon feedstock with a first catalyst including a zeolite of the ZSM-12 family; and obtaining a second effluent oil by contacting the first effluent oil with a second catalyst including a zeolite of the ZSM-48 family.

For example, a process for isomerizing a hydrocarbon feedstock may be performed while supplying the hydrocarbon feedstock, which includes normal paraffins, particularly, with hydrogen, thus converting the normal paraffins into iso-paraffins. The hydrocarbon feedstock may include, for example, a mineral, synthetic or biomass-derived feedstock.

In particular, a process of selectively removing the substances that induce haze in paraffins may be performed, which include long-chain normal paraffins, partially isomerized long-chain normal paraffins, and cycloparaffins, through a selective cracking or deep isomerization reaction.

According to an example, the hydrocarbon feedstock may include, for example, normal paraffins in an amount of at least about 8 wt % or at least about 15 wt %. In addition, the hydrocarbon feedstock may include, for example, sulfur in an amount less than or equal to about 30 ppm (wt), specifically less than or equal to about 15 ppm (wt), or nitrogen in an amount less than or equal to about 10 ppm (wt), specifically less than or equal to 5 ppm (wt).

Detailed examples of the hydrocarbon feedstock may be a hydrocarbon oil having a boiling point range (which may be measured using ASTM D-86 or ASTM D-2887) of at least about 150° C. to about 750° C., specifically a middle distillate including kerosene and gas oils, and a hydrocarbon distillate having a boiling point range of a lube base oil. In particular, the hydrocarbon distillate having a boiling point of 530° C. or higher may include mainly a haze-inducing substance, and thus a raw material including the hydrocarbon distillate having a boiling point of 530° C. or higher may be a hydrocarbon feedstock that is more suitable for the present reaction.

Typical examples of the above-mentioned hydrocarbon feedstock may be oils derived from a solvent refining process, for example, a raffinate, a partially solvent dewaxed oil, a deasphalted oil, a distillate, a decompression gas oil, a caulking gas oil, an unconverted oil for a fuel oil hydrocracking process, and a gas oil distillate. In addition, the hydrocarbon feedstock may include waxes and the like derived from a Fischer-Tropsch reaction. In particular, the hydrocarbon distillate having a boiling point of 530° C. or higher may include mainly a haze-inducing substance, and thus a raw material including the hydrocarbon distillate having a boiling point of 530° C. or higher may be a hydrocarbon feedstock more suitable for the present reaction.

The hydroisomerization process may be performed for the hydrocarbon feedstock under conditions such as, for example, a temperature of about 200° C. to about 500° C., specifically of about 220° C. to about 450° C., and, more specifically, of about 240° C. to about 400° C., and a hydrogen pressure of about 1 atm to about 200 atm, specifically of about 100 atm to about 180 atm, and, more specifically, of about 130 atm to about 160 atm, a liquid hourly space velocity (LHSV) of about 0.1 $hr^{-1}$ to about 10 $hr^{-1}$, specifically about 0.5 $hr^{-1}$ to about 5 $hr^{-1}$, and, more specifically, about 1 $hr^{-1}$ to about 2 $hr^{-1}$, and a hydrogen/feedstock ratio of about 45 $Nm^3/m^3$ to about 1,780 $Nm^3/m^3$, specifically about 200 $Nm^3/m^3$ to about 1,000 $Nm^3/m^3$, and, more specifically, about 480 $Nm^3/m^3$ to about 530 $Nm^3/m^3$.

After the above-mentioned hydroisomerization process, a pour point of the hydrocarbon distillate, which is the hydrocarbon feedstock, may be decreased to, for example, at least about −10° C., and specifically to at least about −20° C.

In addition, when the hydrocarbon feedstock is a hydrocarbon distillate having a boiling point range of the lube base oil, a viscosity index of the hydrocarbon feedstock may be within a range of, for example, at least about 60, specifically about 70 to about 160, and, more specifically, about 90 to about 150.

A silica/alumina mol ratio (SAR) of the zeolite may be an important factor that affects activity of the hydroisomerization catalyst. According to an example, an SAR ($SiO_2$: $Al_2O_3$) of the first catalyst including the zeolite of the ZSM-12 family may be desirably from 60:1 to 300:1, more desirably 70:1 to 180:1. When the SAR is less than or exceeds the above range, it may be difficult to synthesize a material having the ZSM-12 zeolite structure or a desirable hydroisomerization catalyst reaction may not occur.

In addition, an SAR ($SiO_2$:$Al_2O_3$) of the second catalyst including the zeolite of the ZSM-48 family may be desirably from 60:1 to 300:1, more desirably 80:1 to 200:1. When the SAR is less than or exceeds the above SAR range, it may be difficult to synthesize a material having the EU-2 zeolite structure or a desirable hydroisomerization catalyst reaction may not occur.

The first catalyst and the second catalyst may be desirably included at a volume ratio of 1:99 to 80:20, more desirably 1:99 to 50:50. When the first catalyst is included at the above volume ratio or less, haze may not be reduced, and when the first catalyst is included at the above volume ratio or greater, yield may be decreased.

The first and second catalysts may include metals having a hydrogenation (hydrogenation-dehydrogenation) function, respectively. The metals may be desirably at least one selected from groups VIII and VI metals on the periodic table, based on the IUPAC classification. Examples of such metals may be iron (Fe), nickel (Ni), molybdenum (Mo), cobalt (Co), tungsten (W), manganese (Mn), copper (Cu), ruthenium (Ru), platinum (Pt), palladium (Pd), or a combination thereof, specifically platinum (Pt) or palladium (Pd), and desirably platinum (Pt).

The metals having the hydrogenation function or the combination thereof may be included in an amount of, for example about 0.05 wt % to 5 wt %, specifically about 0.1 wt % to 3 wt %, and, more specifically, about 0.2 wt % to 1 wt %, based on the total weight of the hydroisomerization catalyst.

A metal supporting method may be performed using methods known in the related art, for example, a pore volume impregnation method, a continuous solution impregnation method, and an ion exchange method. Furthermore, in order to additionally increase isomerization performance or adjust the activity of acid sites, a dopant or the like may be added to the hydroisomerization catalyst. Examples of the dopant may be an alkali metal, an alkaline earth metal, halogen, phosphorus, boron, and rare earth.

The first and second catalysts may include at least one additional inorganic oxide binder, respectively. For example, the hydroisomerization catalyst may allow a matrix to be produced, using a binder or the like known in the related art, to improve physical/mechanical properties or to perform molding. Examples of such a binder may be clay, an inorganic oxide, or a combination thereof, and the inorganic oxide may be, for example, pseudoboehmite, silica, alumina, titania, magnesia, germania, thoria, boria, silica-alumina, silica-magnesia, silica-zirconia, silica-thoria, and silica-titania.

In some cases, it may be desirable not to affect the intrinsic acid sites of the zeolites of the ZSM-48 and ZSM-12 families by using a binder having low acidity.

For example, each of the zeolites of the ZSM-48 and ZSM-12 families or a mixture thereof may be co-mulling with the binder, and then extruded using a common extrusion technique. A ratio of the zeolite to the binder may be adjusted to, for example, about 90:10 to about 30:70, specifically to about 70:30 to about 50:50, based on the total weight of the zeolite and the binder, but the present disclosure is not limited thereto.

The hydroisomerization catalyst according to an example, may be produced by supporting a metal component to a molded article including each of the zeolites of the ZSM-48 and ZSM-12 families or the mixture thereof and the binder, for example, an extrusion. A molding technique widely known in the related art may be used to produce the support, and the molded article may be extruded and palletized to have various forms and sizes, using, for example, a screw extruder, a plate extruder, or a ram extruder.

In addition, the metal component having a hydrogenation function may be provided in typical precursor form, and may be loaded on the support and then dried and calcined.

The drying may be performed in a temperature range of, for example, about 60° C. to 200° C., and the calcination may be performed for, for example, about 0.5 hours to about 20 hours at a temperature of about 300° C. to 700° C., preferably for about 2 hours to about 10 hours at a temperature of about 400° C. to 600° C.

Selectively drying, reducing, pre-sulfidation, steaming, and the like may be performed to activate or pre-treat the hydroisomerization catalyst prior to the hydroisomerization reaction. In particular, when a noble metal is used as the metal having the hydrogenation function, the noble metal may be reduced under conditions such as a temperature of about 250° C. to about 350° C. and a pressure of about 1 atm to about 200 atm for about 1 hours to 24 hours.

According to another aspect of the present disclosure, a hydroisomerization catalyst system having reduced haze may be provided.

The hydroisomerization catalyst system having reduced haze may include: a first catalytic region having a first catalyst disposed therein, the first catalyst including a zeolite of the ZSM-12 family; and a second catalytic region having a second catalyst disposed therein, the second catalyst including a zeolite of the ZSM-48 family, in which the first catalytic region may be disposed upstream of the second catalytic region.

In relation to the first and second catalysts, all disclosures of the process for reducing haze in a heavy base oil may be applied thereto.

For example, according to an example, the first catalyst may include a ZSM-12 zeolite, and the second catalyst may include at least one selected from the group consisting of ZSM-48, EU-2, ZBM-30 and EU-11 zeolites.

The first and second catalytic regions may be disposed within the same reactor or different reactors, and when the first and second catalysts are disposed within the same reactor, for example, a layer may be disposed within the reactor, and a catalyst including a zeolite of the ZSM-12 family as a support may be positioned on an upper end of a catalyst including a zeolite of the ZSM-48 family as a support.

The process for reducing haze in a heavy base oil and the hydroisomerization catalyst system having reduced haze according to an example may maintain a high yield in the hydroisomerization process, thereby improving cold flow properties of the heavy base oil and obtaining the heavy base oil having reduced haze.

Hereinafter, the present disclosure will be described through specific examples thereof in more detail. The following examples are only for a better understanding of the present disclosure, and the scope of the present disclosure is not limited thereto.

EXAMPLE

In this example, the term "viscosity index" may refer to a scale for measuring changes in viscosity according to a temperature, and, as a paraffin content is high, the viscosity index may increase.

The term "haze number" may be obtained by leaving a transparent glass tube having about 8 cc of a product in a refrigerated bath circulator maintained at a temperature of 0° C. for 24 hours and then measuring a degree of hazing of the product, using the Hazen color value of a color analyzer, whereby a degree of hazing of a plurality of product samples may be measured within a short time.

The process of "low-temperature storage stability evaluation" may be undertaken, which comprises leaving a transparent plastic container having about 100 cc of a product in a refrigerator, maintained at a temperature of 0° C. and having a transparent window, for 7 days, and then determining a degree of hazing of the product with the naked eye through visually imaging the transparent plastic container, thereby accurately determining the degree of hazing of the product.

In addition, an SAR of a zeolite may be measured by a common chemical analysis technique, for example, X-ray fluorescence analysis, inductively coupled plasma atomic emission spectroscopy (ICP-AES), and the like.

1. Preparation of Catalyst

Preparation Example 1

A EU-2 zeolite having an SAR of 130 and a pseudoboehmite binder were mixed at a weight ratio of 7:3, and the mixture was impregnated with a $[Pt(NH_3)_4](NO_3)_2$ solution, using a pore volume impregnation method, such that a content of the $[Pt(NH_3)_4](NO_3)_2$ solution could be 0.6 wt %, based on the total weight of a platinum (Pt) content.

When the impregnation was completed, the mixture was prepared into a molded article through extrusion, and then the molded article was dried at a temperature of 120° C. for 3 hours and calcined at a temperature of 500° C. for 3 hours, to prepare a catalyst. In addition, the catalyst was prepared to have a mesh size of 16 to 40 through subsequent grinding thereof. The catalyst prepared in such a manner was referred to as a "EU-2(130) catalyst."

Preparation Example 2

A zeolite of the ZSM-12 family and having an SAR of 90 and a pseudoboehmite binder were mixed at a weight ratio of 7:3, and the mixture was impregnated with a $[Pt(NH_3)_4](NO_3)_2$ solution, using a pore volume impregnation method, such that a content of the $[Pt(NH_3)_4](NO_3)_2$ solution could be 0.6 wt %, based on the total weight of a platinum (Pt) content.

When the impregnation was completed, the mixture was prepared into a molded article through extrusion, and then the molded article was dried at a temperature of 120° C. for 3 hours and calcined at a temperature of 500° C. for 3 hours, to prepare a catalyst. In addition, the catalyst was prepared to have a mesh size of 16 to 40 through subsequent grinding thereof. The catalyst prepared in such a manner was referred to as a "ZSM-12(90) catalyst."

Preparation Examples 3 to 7

Using the same manner as described above, catalysts were prepared using two types of ultrastable Y (USY) zeolites having SARs of about 60 and about 80, a mordenite (MOR) zeolite having an SAR of about 60, and two types of beta-type (BEA) zeolites having SARs of about 75 and about 300.

The catalysts prepared in such a manner were referred to as a "USY(60) catalyst," a "USY(80) catalyst," an "MOR (60) catalyst," a "BEA(75) catalyst," and a "BEA(300) catalyst," respectively.

2. Hydroisomerization Reaction Experiment

Comparative Experimental Example 1

A fixed layer reactor having a ¾-inch internal diameter was charged with 55 cc of the EU-2(130) catalyst obtained according to Preparation Example 1, the EU-2(130) catalyst was activated under a hydrogen atmosphere at a temperature of 250° C. for 5 hours or more, and then a hydroisomerization reaction experiment was conducted on the EU-2(130) catalyst.

In the hydroisomerization experiment, a feedstock was generated in a solvent deasphalting process, and a deasphalted oil that had undergone a pre-hydrotreating process was used. Physical properties of the generated feedstock are illustrated in Table 1 below. Boiling points were measured using ASTM D2887. Pour points were measured using ASTM D97.

TABLE 1

| Specific Gravity | 0.8729 |
|---|---|
| API, 60° F. | 30.6 |
| Boiling Point (Distillation, D2887), ° C. | |
| 0% | 367 |
| 5% | 396 |
| 10% | 412 |
| 30% | 457 |
| 50% | 496 |
| 70% | 538 |

TABLE 1-continued

| | |
|---|---|
| 90% | 608 |
| 95% | 643 |
| 100% | 719 |
| Sulfur Content (wtppm) | 8.8 |
| Nitrogen Content (wtppm) | 0.6 |
| Kinematic Viscosity (@40° C, cSt) | 88.2 |
| Kinematic Viscosity (@100° C, cSt) | 11.07 |
| Viscosity Index | 112 |
| Pour Point (° C.) | 45 |

As illustrated in Table 1 above, the feedstock may include a hydrocarbon distillate of about 30 wt % or greater including mainly a haze-inducing substance and having a boiling point of about 530° C. or higher.

The feedstock was injected into a reactor at a rate of 57.6 g/hr (66 cc/hr) through a pump, and isomerization reaction conditions were adjusted to a pressure of 150 atm and a hydrogen injection rate of 33.3 NL/hr. A hydrogen/feedstock ratio was about 500 Nm³/m³. Changes in physical properties of a product such as pour point, yield (based on the weight ratio of a product having a boiling point of 395° C. or higher), haze number, and the like, were observed according to a reaction temperature during the isomerization reaction. The results are illustrated in Table 2 below.

The haze numbers illustrated in Table 2 below were obtained by leaving a glass tube having about 8 cc of a product in a refrigerated bath circulator maintained at a temperature of 0° C. for 24 hours and then measuring a degree of hazing of the product, using the Hazen color value of a color analyzer, whereby a degree of hazing of a plurality of product samples may be measured within a short time.

As illustrated in Table 2 below, when the reaction temperature increased, the pour point and the haze number desirably decreased, while the yield, undesirably, also decreased.

Experimental Example 1 and Comparative Experimental Examples 2 to 6

An upper end of a fixed layer reactor having a ¾-inch internal diameter was charged with 5.5 cc of one of the ZSM-12(90) catalyst, the USY(60) catalyst, the USY(80) catalyst, the MOR(60) catalyst, the BEA(75) catalyst, and the BEA(300) catalyst prepared according to Preparation Examples 2 to 7, and a lower end of the fixed layer reactor was charged with 49.5 cc of the EU-2(130) catalyst prepared according to Preparation Example 1. A volume ratio of one of the ZSM-12(90) catalyst, the USY(60) catalyst, the USY(80) catalyst, the MOR(60) catalyst, the BEA(75) catalyst, and the BEA(300) catalyst prepared according to Preparation Examples 2 to 7 to the EU-2(130) catalyst prepared according to Preparation Example 1 was 10:90.

Except for the use of other catalysts as described above, a hydroisomerization reaction experiment was conducted using the same process as that in Comparative Experimental Example 1. Also, changes in physical properties of a product, such as pour point, yield (based on the weight ratio of a product having a boiling point of 395° C. or higher), haze number, and the like, were observed according to a reaction temperature during the isomerization reaction. The results are illustrated in Table 2 below.

In Table 2 below, the case of Experimental Example 1, for example, in which the upper end of the fixed layer reactor was charged with the ZSM-12(90) catalyst and the lower end thereof with the EU-2(130) catalyst, was referred to as a "ZSM-12 (90)/EU-2 (130) catalyst," and the cases of the remaining Comparative Experimental Examples 1 to 6 were referred to as a "EU-2(130) Catalyst," a "USY(60)/EU-2 (130) Catalyst," a "USY(80)/EU-2(130) Catalyst," a "MOR (60)/EU-2(130) Catalyst, a "BEA(75)/EU-2(130) Catalyst," and a "BEA(300)/EU-2(130) Catalyst" in the same manner as that in the Experimental Example

TABLE 2

| | Catalyst Name | Reaction Temperature (° C.) | Pour Point (° C.) | Yield (%) | Haze Number |
|---|---|---|---|---|---|
| Comparative Experimental Example 1 | EU-2(130) Catalyst | 325 | −30 | 89.8 | 69 |
| | | 330 | −41 | 88.3 | 46 |
| | | 335 | −48 | 87.1 | 32 |
| Experimental Example 1 | ZSM-12(90)/ EU-2(130) Catalyst | 315 | −30 | 89.8 | 59 |
| | | 320 | −40 | 88.0 | 39 |
| | | 325 | −46 | 86.4 | 27 |
| Comparative Experimental Example 2 | USY(60)/ EU-2(130) Catalyst | 305 | −7 | 75.5 | 633 |
| | | 310 | −25 | 67.0 | 255 |
| | | 315 | — | 59.0 | 47 |
| Comparative Experimental Example 3 | USY(80)/ EU-2(130) Catalyst | 315 | −14 | 88.8 | 254 |
| | | 320 | −23 | 88.4 | 140 |
| | | 325 | −35 | 86.7 | 44 |
| | | 330 | −42 | 85.1 | 38 |
| Comparative Experimental Example 4 | MOR(60)/ EU-2(130) Catalyst | 315 | −18 | 88.6 | 169 |
| | | 320 | −33 | 86.9 | 52 |
| | | 325 | −44 | 85.2 | 30 |
| Comparative Experimental Example 5 | BEA(75)/ EU-2(130) Catalyst | 310 | −4 | 90.0 | 498 |
| | | 315 | −29 | 87.1 | 53 |
| | | 320 | −42 | 84.6 | 33 |
| Comparative Experimental Example 6 | BEA(300)/ EU-2(130) Catalyst | 310 | −8 | 88.6 | 397 |
| | | 315 | −35 | 87.7 | 44 |
| | | 320 | −45 | 82.1 | 30 |

As illustrated in Table 2 above, when the reaction temperature for all the catalysts to be evaluated increased, the pour point and the haze number desirably decreased, while the yield, undesirably, decreased.

The ZSM-12(90)/EU-2(130) catalyst was further reduced in haze number in relation to the same yield using the EU-2 (130) catalyst. Thus, when a catalyst including a zeolite of the ZSM-12 family as a support was added as a support to an upper end of a catalyst including the EU-2 zeolite, which is a support of a common dewaxing catalyst, a haze-inducing substance could be removed from the heavy base oil more selectively. In other words, when sequentially using the catalyst including the zeolite of the ZSM-12 family and the catalyst including the EU-2 zeolite, a haze-inducing substance was selectively removed from the heavy base oil more effectively. Furthermore, the ZSM-12(90)/EU-2(130) catalyst could have a reaction temperature desirably decreased, by about 10° C., compared to the EU-2(130) catalyst, and meet the same pour point.

The USY(60)/EU-2(130) catalyst, the USY(80)/EU-2 (130) catalyst, the MOR(60)/EU-2(130) catalyst, the BEA (75)/EU-2(130) catalyst, and the BEA(300)/EU-2(130) catalyst were decreased in reaction temperature to meet the same pour point, compared to the EU-2(130) catalyst, but further increased in haze number, in relation to the same yield.

Thus, when a catalyst including USY(60), USY(80), MOR(60), BEA(75), and BEA(300) zeolites as a support is added as a support to an upper end of a catalyst including the EU-2 zeolite, which is a support of a common dewaxing catalyst, a haze-inducing substance was not removed effectively and selectively from the heavy base oil.

Comparative Experimental Example 7

An upper end of a fixed layer reactor having a ¾-inch internal diameter was charged with 49.5 cc of the EU-2(130)

catalyst prepared according to Preparation Example 1, and a lower end of the fixed layer reactor was charged with 5.5 cc of the ZSM-12(90) catalyst prepared according to Preparation Example 2. As described above, the case in which the upper end of the fixed layer reactor was charged with the EU-2(130) catalyst and the lower end thereof with the ZSM-12(90) catalyst, was referred to as a "EU-2(130)/ZSM-12(90) catalyst." Except for the use of other catalysts as described above, catalyst evaluation was conducted in the same manner as that in Comparative Experimental Example 1. The results are illustrated in Table 3 below.

The EU-2(130)/ZSM-12(90) catalyst was decreased in reaction temperature to meet the same pour point, compared to the EU-2(130) catalyst, but further increased in haze number in relation to the same yield. Thus, when a catalyst including a zeolite of the ZSM-12 family as a support is added as a support to a lower end of a catalyst including the EU-2 zeolite, which is a support of a common dewaxing catalyst, a haze-inducing substance was not removed effectively and selectively from the heavy base oil. In other words, when sequentially using the catalyst including the EU-2 zeolite and the catalyst including the zeolite of the ZSM-12 family, the haze-inducing substance was not removed effectively and selectively from the heavy base oil.

Comparative Experimental Example 8

A EU-2 zeolite having an SAR of 130, a zeolite of the ZSM-12 family having an SAR of 90, and a pseudoboehmite binder were mixed at a weight ratio of 6.3:0.7:3. A weight ratio of the zeolite of the ZSM-12 family to the EU-2 zeolite was 10:90. The mixture was impregnated with a $[Pt(NH_3)_4](NO_3)_2$ solution, using a pore volume impregnation method, such that the content of the $[Pt(NH_3)_4](NO_3)_2$ solution could be 0.6 wt %, based on the total weight of a platinum (Pt) content.

When the impregnation was completed, the mixture was prepared into a molded article through extrusion, and then the molded article was dried at a temperature of 120° C. for 3 hours and calcined at a temperature of 500° C. for 3 hours to prepare a catalyst. In addition, the catalyst was prepared to have a mesh size of 16 to 40 through subsequent grinding thereof. The catalyst prepared in such a manner was referred to as a "EU-2(130)+ZSM-12(90) mixed catalyst," and using the EU-2(130)+ZSM-12(90) mixed catalyst, hydroisomerization reaction evaluation was conducted in the same manner as that in Comparative Experimental Example 1.

Changes in physical properties of a product, such as pour point, yield (based on the weight ratio of a product having a boiling point of 395° C. or higher), haze number, and the like, were observed according to a reaction temperature during the isomerization reaction. The results are illustrated in Table 3 below.

TABLE 3

| | Catalyst Name | Reaction Temperature (° C.) | Pour Point (° C.) | Yield (%) | Haze Number |
|---|---|---|---|---|---|
| Comparative Experimental Example 7 | EU-2(130)/ ZSM-12(90) Catalyst | 315<br>320 | −32<br>−41 | 87.9<br>86.1 | 82<br>39 |
| Comparative Experimental Example 8 | EU-2(130) + ZSM-12(90) Mixed Catalyst | 310<br>315 | −27<br>−40 | 89.9<br>88.0 | 90<br>47 |

As illustrated in Table 3, the EU-2(130)+ZSM-12(90) mixed catalyst was decreased in reaction temperature to meet the same pour point, but was similar in haze number in relation to the same yield, compared to the EU-2(130) catalyst.

For example, a catalyst prepared by mixing a zeolite of the ZSM-12 family with the EU-2 zeolite, which is a support of a common dewaxing catalyst, in a catalyst preparation process, was disadvantageous in selectively removing a haze-inducing substance, compared to the subsequent use of the catalyst including the zeolite of the ZSM-12 family and the catalyst including the EU-2 zeolite.

Experimental Examples 2 to 4

An upper end of a fixed layer reactor having a ¾-inch internal diameter was charged with 1.65 cc of the ZSM-12 (90) catalyst prepared according to Preparation Example 2, and a lower end of the fixed layer reactor was charged with 53.35 cc of the EU-2(130) catalyst prepared according to Preparation Example 1. A volume ratio of the ZSM-12(90) catalyst to the EU-2(130) catalyst was 3:97. A prepared catalyst was referred to as a "ZSM-12(90)/EU-2(130) (3:97) catalyst," and catalyst evaluation was conducted thereon in the same manner as that in Comparative Experimental Example 1.

Using the same manner described above, catalyst evaluation was conducted on a ZSM-12(90)/EU-2(130) (20:80) catalyst and a ZSM-12(90)/EU-2(130) (30:70) catalyst.

Changes in physical properties of a product such as pour point, yield (based on the weight ratio of a product having a boiling point of 395° C. or higher), haze number, and the like, were observed according to a reaction temperature during the isomerization reaction.

The ZSM-12(90)/EU-2(130) (3:97), ZSM-12(90)/EU-2 (130) (20:80), and ZSM-12(90)/EU-2(130) (30:70) catalysts were similar in haze number according to yield (based on the weight ratio of a product having a boiling point of 395° C. or higher). Thus, when sequentially using a catalyst including a zeolite of the ZSM-12 family and a catalyst including the EU-2 zeolite, a haze-inducing substance was removed effectively and selectively from the heavy base oil under conditions such as volume ratios of the catalyst including the zeolite of the ZSM-12 family to the catalyst including the EU-2 zeolite of 3:97, 10:90, 20:80, and 30:70.

3. Low-Temperature Storage Stability Evaluation

Low-temperature storage stability evaluation was conducted on specimens whose haze numbers were measured according to yield in Experimental Examples 1 to 4 and Comparative Experimental Examples 1 to 8. The low-temperature storage stability evaluation may be undertaken, which comprises leaving a transparent plastic container having about 100 cc of a product in a refrigerator, maintained at a temperature of 0° C. and having a transparent window, for 7 days, and then determining a degree of hazing of the product with the naked eye through visually imaging the transparent plastic container, thereby accurately determining the degree of hazing of the product.

A degree of hazing of the product through the low-temperature storage stability evaluation was the same as that of hazing between the specimens indicated by the haze numbers.

As set forth above, according to the examples, a process for reducing haze in a heavy base oil and a hydroisomerization catalyst system having reduced haze may maintain a high yield in a hydroisomerization process, thereby improving cold flow properties of the heavy base oil and obtaining the heavy base oil having reduced haze.

While exemplary embodiments have been shown and described above, it will be apparent to those skilled in the art that modifications and variations could be made without departing from the scope of the present invention, as defined by the appended claims.

What is claimed is:

1. A hydroisomerization catalyst system for reducing haze in a heavy base oil, the hydroisomerization catalyst system comprising:
   a first catalytic region having a first catalyst disposed therein, the first catalyst including a zeolite of the ZSM-12 zeolite; and
   a second catalytic region having a second catalyst disposed therein, the second catalyst including at least one selected from the group consisting of ZSM-48, EU-2, ZMB-30, and EU-11 zeolite,
   wherein the first catalytic region is disposed upstream of the second catalytic region.

2. The hydroisomerization catalyst system of claim 1, wherein the first catalyst and the second catalyst are disposed at a volume ratio of 1:99 to 80:20.

3. The hydroisomerization catalyst system of claim 1, wherein the first catalyst and the second catalyst include at least one metal selected from a group VIII metal and a group VI metal.

4. The hydroisomerization catalyst system of claim 3, wherein the at least one metal is at least one selected from iron (Fe), nickel (Ni), molybdenum (Mo), cobalt (Co), tungsten (W), manganese (Mn), copper (Cu), ruthenium (Ru), platinum (Pt), and palladium (Pd).

5. The hydroisomerization catalyst system of claim 1, wherein a $SiO_2:Al_2O_3$ ratio of the first catalyst ranges from 60:1 to 300:1.

6. The hydroisomerization catalyst system of claim 1, wherein a $SiO_2:Al_2O_3$ ratio of the second catalyst ranges from 60:1 to 300:1.

7. The hydroisomerization catalyst system of claim 1, wherein the first catalyst and the second catalyst further include at least one inorganic oxide binder, respectively.

8. The hydroisomerization catalyst system of claim 7, wherein the at least one inorganic oxide binder is at least one selected from the group consisting of psuedoboehmite, silica, alumina, titania, magnesia, germania, thoria, boria, silica-alumina, silica-magnesia, silica-zirconia, silica-thoria, and silica-titania.

9. A process for reducing haze in a heavy base oil, the process comprising:
   obtaining a first effluent by contacting the heavy base oil with a first catalyst including a zeolite of the ZSM-12 zeolite; and
   obtaining a second effluent oil by contacting the first effluent oil with a second catalyst including at least one selected from the group consisting of ZSM-48, EU-2, ZBM-30, and EU-11 zeolite.

10. The process of claim 9, wherein the first catalyst and the second catalyst are included at a volume ratio of 1:99 to 80:20.

11. The process of claim 9, wherein the first catalyst and the second catalyst include at least one metal selected from a group VIII metal and a group VI metal.

12. The process of claim 11, wherein the at least one metal is at least one selected from iron (Fe), nickel (Ni), molybdenum (Mo), cobalt (Co), tungsten (W), manganese (Mn), copper (Cu), ruthenium (Ru), platinum (Pt), and palladium (Pd).

13. The process of claim 9, wherein a $SiO_2:Al_2O_3$ ratio of the first catalyst ranges from 60:1 to 300:1.

14. The process of claim 9, wherein a $SiO_2:Al_2O_3$ ratio of the second catalyst ranges from 60:1 to 300:1.

15. The process of claim 9, wherein the first catalyst and the second catalyst further include at least one inorganic oxide binder, respectively.

16. The process of claim 15, wherein the at least one inorganic oxide binder is at least one selected from the group consisting of psuedoboehmite, silica, alumina, titania, magnesia, germania, thoria, boria, silica-alumina, silica-magnesia, silica-zirconia, silica-thoria, and silica-titania.

* * * * *

UNITED STATES PATENT AND TRADEMARK OFFICE
CERTIFICATE OF CORRECTION

| | | |
|---|---|---|
| PATENT NO. | : 10,544,374 B2 | Page 1 of 1 |
| APPLICATION NO. | : 15/496506 | |
| DATED | : January 28, 2020 | |
| INVENTOR(S) | : Do Kyoung Kim et al. | |

It is certified that error appears in the above-identified patent and that said Letters Patent is hereby corrected as shown below:

In the Claims

Column 14, Line 9, Claim 9, after "effluent" insert -- oil --

Signed and Sealed this
Fifth Day of May, 2020

Andrei Iancu
*Director of the United States Patent and Trademark Office*